United States Patent [19]

Sanderson et al.

[11] 3,803,353

[45] Apr. 9, 1974

[54] OPTICAL-TO-ELECTRICAL SIGNAL TRANSDUCER METHOD AND APPARATUS

[75] Inventors: Robert L. Sanderson; Marvin G. Harrison, both of Rochester, N.Y.

[73] Assignee: Eastman Kodak Company, Rochester, N.Y.

[22] Filed: Sept. 8, 1972

[21] Appl. No.: 287,295

[52] U.S. Cl. ............ 178/7.2, 178/7.7, 178/DIG. 28

[51] Int. Cl. ............ H04n 5/30

[58] Field of Search ...... 178/DIG. 28, 7.1, 69.5 TV, 178/69.5 F, 7.2, 7.7

[56] References Cited

UNITED STATES PATENTS

| | | | |
|---|---|---|---|
| 3,445,588 | 5/1969 | Nicholson | 178/DIG. 28 |
| 2,855,539 | 10/1958 | Hoover | 178/15 |
| 3,096,441 | 7/1963 | Burkhardt | 356/170 |
| 3,562,418 | 2/1971 | Glusick | 178/7.1 |

*Primary Examiner*—Robert L. Richardson

[57] ABSTRACT

Method and apparatus for optically scanning in a predetermined pattern M rows and N columns of M × N elementary points of an image on information bearing media located in a scanning station and producing electrical signals indicative of the information content of the scanned elementary points. Each of the M rows of N elementary points of the image are sequentially illuminated by a narrow, elongated beam of radiation. A lens assembly directs the radiation transmitted by each of the N elements in the illuminated row upon a corresponding one of N radiation sensitive devices arranged in a linear array extending in the direction of the m rows. Each radiation sensitive device responds to the intensity of the radiation transmitted by the corresponding elementary point in the particular row illuminated by the narrow, elongated beam of radiation to produce an electrical signal indicative of the information content of the elementary point. The electrical signals produced by the N radiation sensitive devices are read out in a sequence determined by a first synchronization signal. A second synchronization signal is produced each time the electrical signal produced by one of the N radiation sensitive devices is detected in response to the first synchronization signal. The M rows of N elementary points are sequentially illuminated in response to the second synchronization signal. Images on the information bearing media may be intermittently or continuously advanced through the scanning station. Furthermore, the linear array of radiation sensitive devices may be made sensitive to one or more colors of light in the images to produce electrical signals representative of the color information of each elementary point.

10 Claims, 7 Drawing Figures

OPTICAL-TO-ELECTRICAL SIGNAL TRANSDUCER METHOD AND APPARATUS

CROSS REFERENCE TO RELATED APPLICATIONS

Reference is made to commonly assigned, copending U.S. application Ser. No. 60,493, entitled FILM SCANNING FOR TELEVISION REPRODUCTION, filed in the names of David L. Babcock and Lenard M Metzger on Aug. 3, 1970, and the commonly assigned, copending U.S. application Ser. No. 191,673, entitled METHOD AND APPARATUS FOR DERIVING THE VELOCITY AND RELATIVE POSITION OF CONTINUOUSLY MOVING INFORMATION BEARING MEDIA filed by John J. Bradley, Carl N. Schauffele and J. A. St. Clair II on Oct. 22, 1971 and now U.S. Pat. No. 3,723,650.

BACKGROUND OF THE INVENTION

1. Field of the Invention

This invention relates to optical-to-electrical signal transducer apparatus, and more particularly to a method and apparatus employing a linear array of radiation sensitive means in combination with a linear array of radiation sources for sequentially producing a narrow, elongated beam of radiation illuminating successive portions of an image to produce electrical signals representative of the information content of the image.

2. Description of the Prior Art

There are many examples, in the prior art, of optical-to-electrical signal transducer apparatus for scanning M rows and N columns of M × N elementary points of an image on information bearing media to produce a corresponding number of electrical signals indicative of the information content thereof. One form of such apparatus normally employs a discrete source of radiation traversing each of the M × N elementary points of the image and a photosensor responsive to the intensity of the radiation modulated by the information content of each elementary point to produce the corresponding electrical signals. Examples of such prior art apparatus include the Nipkow type scanning disc apparatus shown, for example, in U.S. Pat. No. 2,248,554 entitled PRODUCTION OF AN INTERLACED LINE SCREEN WITH MECHANICAL SCANNING MEANS, and cathode ray scanning systems shown, for example, in U.S. Pat. No. 2,922,841 entitled FILM SCANNING SYSTEM, for generating a moving spot of light for traversing, in a two dimensional pattern, each of the elementary points of an image on information bearing media.

A second type of widely accepted optical-to-electrical signal transducer apparatus employs an image retaining cathode ray tube, shown in operation, for example, in U.S. Pat. No. 2,733,291, entitled COLOR TELEVISION CAMERA, wherein a light image of either a live scene or an image on information bearing media is directed upon the photosensitive image storing screen of a cathode ray tube device, such as an image orthogon, and the stored image is scanned in two dimensions with an electron beam to develop electrical signals representative of the information content of the stored image.

In a further type of optical-to-electrical signal transducer apparatus, the image on information bearing media is advanced one row at a time, and a beam of radiation is deflected along the row to sequentially scan each elementary point thereof as shown, for example, in U.S. Pat. No. 3,267,212 entitled FILM RECORDING REPRODUCING APPARATUS.

In each described type of transducer apparatus, two dimensional scanning of M × N elementary points of an image has been effected either by two dimensional deflection of the scanning beam of radiation over the image or by one dimensional deflection of the scanning beam of radiation and one dimensional movement of the image. The mechanical scanning apparatus described above has never achieved widespread acceptance because such apparatus employs moving parts that are difficult to keep in synchronism with the position of the scanned image. However, the optical-to-electrical signal transducer apparatus employing the cathode ray tube devices described hereinbefore has received wide acceptance in the scanning of two dimensional images on information bearing media, particularly in instances wherein the scanning rate is selected to coincide with the standard television field rate. The apparatus disclosed in the aforementioned U.S. Pat. application Ser. No. 60,493 employs a flying spot scanner and 15,750 Hz. horizontal deflection and 60 Hz. vertical deflection signals to deflect the scanning beam generated by the scanner over an image frame on motion picture film. The cathode ray tube devices are, unfortunately, relatively bulky, require an expensive high voltage power supply to generate the scanning electron beam, and are relatively short lived.

Many solid state electronic devices have been proposed to overcome these difficulties of cathode ray devices including, for example, two dimensional arrays of radiation emissive or radiation sensitive elements that are periodically scanned in a television raster pattern under the control of row and column selecting circuits, such as that apparatus shown, for example, in U.S. Pat. No. 3,622,697 entitled SOLID STATE SCANNING ARRAY FOR INTERLACED SIGNALS. However, to date, such scanning arrays are not available at reasonable cost and quality to compete with cathode ray devices due in part, to difficulties in manufacturing very small two dimensional arrays comprising a relatively large number of elements.

Other scanning devices have been proposed for deflecting a beam of radiation produced, for example, by a laser in two dimensions over real or holographic images on information bearing media. Such deflection is accomplished by analog or digital electrical signals applied to electro-optical deflecting elements as described, for example, in U.S. Pat. No. 3,515,455 entitled DIGITAL LIGHT DEFLECTING SYSTEMS.

Laser beam deflection has also been accomplished through the diffractive interaction between sound waves and a light beam generated by a laser passing through an acousto-optical light beam deflection element of the type shown, for example, in U.S. Pat. No. 3,516,729 entitled CYLINDRICAL LENS COMPENSATION OF WIDE APERTURE BRAGG DIFFRACTION SCANNING ZONE. In such electro-optical or acousto-optical light deflecting apparatus, two or more elements may be employed to scan an image in two dimension.

As mentioned hereinbefore, the cathode ray devices remain the most widely accepted for scanning images on information bearing media or live sceens and producing electrical signals representative thereof for facsimile transmission and reproduction of documents and for television scanning and reproduction of images. The remaining described scanning devices remain relatively expensive and have achieved only limited acceptance in commercial apparatus, such as peripheral components for computers and scientific apparatus.

SUMMARY OF THE INVENTION

Accordingly, it is an object of this invention to provide an improved method and apparatus for optically scanning images on information bearing media and producing electrical signals representative of the information content of such images.

It is a further object of this invention to provide an improved method and apparatus for optically scanning M rows and N columns of M × N elementary points of an image frame on information bearing media to produce M × N electrical signals representative of the information content of the M × N elementary points.

It is also an object of this invention to provide an improved method and apparatus for scanning image frames on information bearing media with radiation and deriving electrical signals representative of the information content of the scanned image frames through the use of a linear array of radiation sensitive devices.

A further object of this invention is to successively illuminate each of M rows of N elementary points of an image frame with radiation and to successively derive electrical signals representative of the radiation modulated in intensity by the information content of each scanned elementary point through the use of a linear array of M point sources of loci of radiation and N radiation sensitive devices.

These and other objects of the invention are embodied in optical-to-electrical signal transducer methods and apparatus for, in accordance with the invention, optically scanning M rows and N columns of M × N elementary points of an image and producing electrical signals representative of the information content of the scanned elementary points of the image by sequentially producing a scanning beam of radiation at one of M loci extending in a first linear array; imaging each of M loci upon a corresponding one of said M rows of N elementary points of said image, whereby one of said M rows is exposed to said beam of radiation originating at a corresponding one of said M loci, and said beam of radiation is modulated in intensity by the information content of that M row; sensing the intensity of the radiation from the N elementary points of that row exposed to said beam of radiation; and sequentially producing N discrete electrical signals representative of the information content of the N respective elementary points, whereby the M rows of N elementary points of said image are sequentially exposed to said beam of radiation, and electrical signals representative of the information content of the N elementary points of said M rows are sequentially produced.

More particularly, the electrical signals are sequentially detected or read out from N radiation sensitive means extending in a second linear array at a first predetermined frequency in response to a first synchronizing signal, and the scanning beam of radiation sequentially illuminates each succeeding row of N elementary points of the image at a second frequency dependent upon a second synchronizing signal. Accordingly, the radiation modulating information content of all of the elementary points of the image illuminated by the M scanning beams of radiation is transduced into electrical signals representative of the information content thereof.

In one preferred embodiment of the invention, each beam of radiation is elongated by a cylindrical lens assembly from one of the M loci arranged in the first linear array extending in parallel with the N columns to illuminate the corresponding row. The N radiation sensitive means extending in a linear array in parallel with the M rows of the image respond to the radiation transmitted thereby to produce N electrical signals that are sequentially detected by the first synchronization signal. The second synchronization signal is produced and applied means providing the M discrete loci of the beam of radiation to shift the production of the scanning beam in sequence.

The invention and its objects and advantages will become more apparent in the detailed description of the preferred embodiment presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
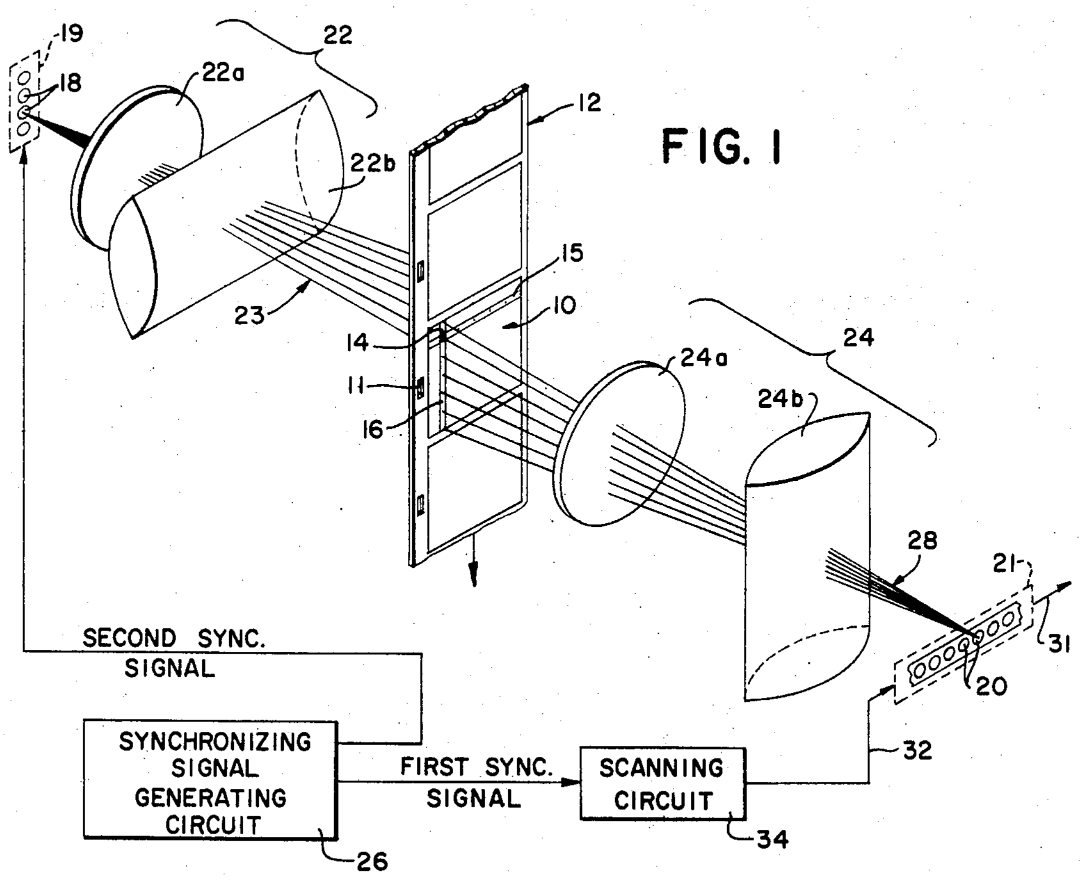
FIG. 1 is a representation in partial perspective of the improved optical-to-electrical signal transducer apparatus, wherein optical scanning in two dimensions is achieved by a linear array of radiation sensitive devices extending in the first dimension and a linear array of point sources of radiation extending in the second dimension.

Referring now to the drawings and first to FIG. 1, there is shown, in simplified form, the improved optical-to-electrical signal transducer apparatus of our invention for scanning M × N elementary points in a two dimensional image or image frame on information bearing media and developing electrical signals representative of the information content of each elementary point. More particularly, in FIG. 1, an image frame 10 on information bearing media 12 comprises M × N elementary points 14 in M rows 15 of N elementary points 14 extending in a first or row dimension and N columns 16 of M elementary points 14 extending in a second or column dimension. The M rows 15 are defined by M time-sequenced point sources or loci 18 of radiation arranged in a linear array 19 extending in the second dimension of the image frame 10. The N columns 16 are defined by N time-sequenced radiation sensitive devices 20 arranged in a linear array 21 extending in parallel with the first dimension of the image frame 10. A first lens assembly 22 (or its optical equivalent) comprises field lens 22*a* and cylindrical lens 22*b* and is responsive to the radiation emitted by an energized point source 18 to extend the radiation into a narrow, elongated beam 23 and to direct the narrow elongated beam 23 upon one of the M rows 15. Similarly, a second lens assembly 24 (or its optical equivalent) comprises a field lens 24*a* and a cylindrical lens 24*b* and is effective to image each of the N columns 16 of M elementary points 14 upon a corresponding one of the N radiation sensitive devices 20.

In order to effect a sequential, two dimensional scanning of the M × N elementary points 14, we provide that the N radiation sensitive devices respond to the radiation in the corresponding N columns 16 to develop N electrical signals representative of the information content of the respective illuminated elementary point. A synchronization signal generating circuit 26 develops a first synchronization signal that is applied to a scanning circuit 34. The scanning circuit 34 may be a multistage shift register having individual outputs (collectively shown as 32) connected to the radiation sensitive devices 20 to sequentially read out the electrical signals generated by the respective radiation sensitive devices 20. In this manner, the first dimension of scanning of the elementary points 14 in each illuminated row 15 of the image frame is accomplished. After N cycles of the first synchronization signal, a second synchronization signal is developed by the synchronization signal generating circuit 26 and is applied to the linear array 19 of point sources 18 of radiation to energize the next succeeding point source 18 in the linear array 19. The first lens assembly 22 directs the radiation emitted by the energized point source 18 upon a next succeeding one of the M rows 15 of the image frame 10. In this manner, the second dimension of scanning of the elementary points 14 of the image frame 10 is accomplished. In summary, M × N electrical signals representative of the information content of the M × N elementary points 14 on the image frame 10 may be sequentially read out in a raster pattern very similar to the conventional two dimensional deflection of a flying spot scanner as shown, for example, in aforementioned U.S. Pat. application Ser. No. 60,493.

Figure 2:
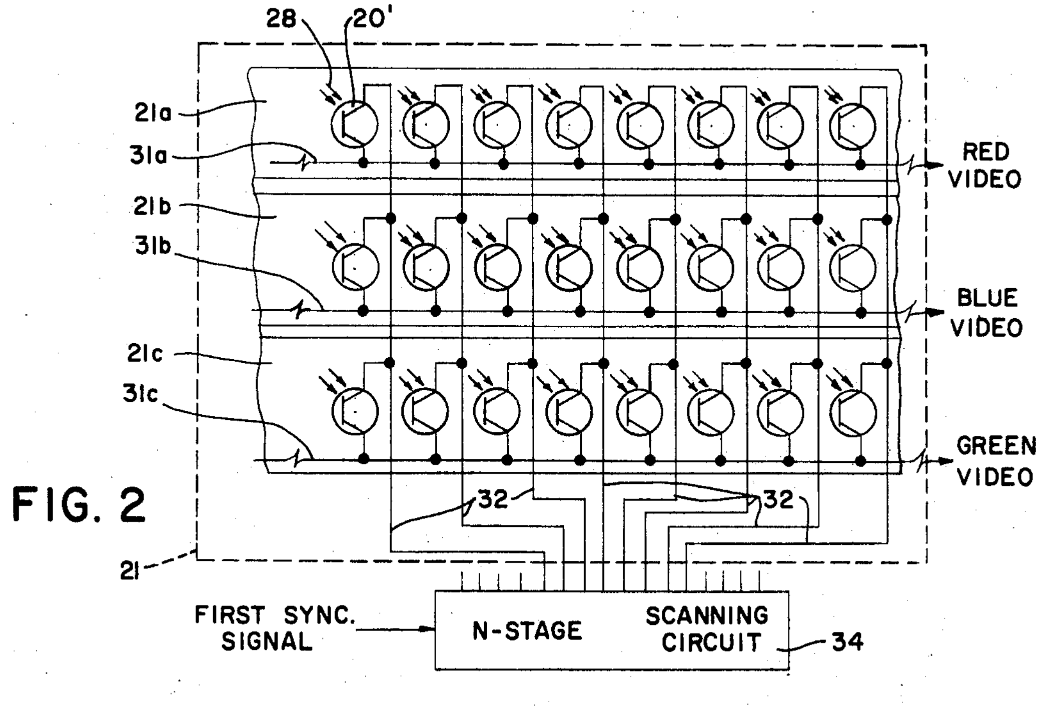
FIG. 2 is an illustration, in partial perspective, of first, second and third linear arrays of radiation sensitive devices suitable for use in FIGS. 1 and 5.

If the image frame 10 comprises monochromatic pictorial or alphanumeric information, the point sources 18 of radiation in the linear array 19 may emit radiation or light of a relatively narrow band width that is capable of being modulated by the information content of the elementary points 14 and is capable of being detected by the radiation sensitive devices 20 in the linear array 21. On the other hand, if the information in the image frames 10 comprises color pictorial information or other wide band information, it may be desirable to employ point sources 18 of radiation having a wide chromatic range and a plurality of linear arrays 21 of N radiation sensitive devices 20 each capable of detecting radiation of a predetermined band width, or light of a particular color, to develop electrical signals representative thereof. Referring to FIG. 2, there is shown a partial illustration of first, second and third linear arrays 21*a*, 21*b* and 21*c*, respectively, of N radiation sensitive phototransistors 20'. The first, second and third linear arrays 21*a*–21*c* may be substituted in the position of a linear array 21 of FIG. 1, at a point, with respect to the second cylindrical lens 24*b* and the field lens 24*a* where radiation from the corresponding illuminated elementary points 14 is directed in a beam 28 simultaneously upon each correspondingly numbered phototransistor 20' in the three linear arrays 21*a*–21*c*, as shown in FIG. 2. The phototransistors 20' of the first linear array 21*a* may be selectively responsive to a first wave length of radiation, such as red light, in the beam of radiation 28 by selective sensitizing the phototransistors of the linear array or by the disposition of a first filter (not shown) positioned over the first linear array 21*a*. In the same manner, the phototransistor 20' of the second and third linear arrays 21*b* and 21*c* may be selectively responsive to second and third wave lengths, such as blue and green light, respectively, in the beam of radiation 28. The arrays may alternatively be sensitive to other colors, e.g., cyan, magenta and yellow in subtractive color systems or designed to provide luminance and chrominance signals in television systems.

The linear arrays 21*a*–21*c* of phototransistors 20' may take the form, for example, of the linear arrays of photosensors described in the article entitled PHOTOSENSOR ARRAYS - THE KEY TO SIMPLER CHARACTER READERS by R. H. Dyck, appearing in the journal entitled *Electro-optical Systems Design*, September/October, 1969, page 36. The photosensor array described in that article may either be of the photodiode form (not shown) or the depicted phototransistor form. All of the collector terminals of the phototransistors 20' are connected in parallel with an output conductor 31*a*, 31*b* or 31*c*. The emitter terminals of correspondingly numbered phototransistors 20' in each of the three arrays 21*a*–21*c* that respond in common to the same beam of radiation 28 are connected in parallel to one of N interrogation conductors 32. The interrogation conductors 32 are connected to a scanning circuit or shift register 34 which responds to the first sync signal applied to its input terminal to sequentially develop, in the time sequence determined by the first sync signal, read out signals that are sequentially applied to the conductors 32.

A single phototransistor 20', connected as a two terminal device — that is, with a base not connected externally operates in the storage mode very much like two diodes connected back to back. One of these diodes is a photodiode; the other acts simply as a switch. During the time period between read out pulses applied to the emitter terminals of the phototransistor 20', an electrical charge proportional to the intensity of the radiation incident thereon is stored on the photodiode portion of the phototransistor 20'. Since the two diode portions work together in a transistor structure, a charge gain is realized in addition to that from the storage phenomenon. At each occurrence of a read out signal applied to the emitter terminal of a phototransistor 20', the accumulated charge is discharged producing an electrical signal proportional to the charge accumulated by the phototransistor 20' on the output conductor 31. A further discussion of the operation of the phototransistor 20' or photodiode may be found in the aforementioned article wherein an exemplary scanning circuit 34 may be found that responds to a synchronization signal to read out each phototransistor 20' in each array in a time sequence.

In summary, the N phototransistors 20'in each of the three linear arrays 21*a*–21*c* respond to the radiation from the N elementary points 14 in an illuminated row 15 of the image frame 10 to develop a charge proportional to the intensity of the incident radiation. This charge is accumulated and stored between successive read out periods of each phototransistor 20'. Although three linear arrays 21*a*–21*c* are depicted in FIG. 2, it will be understood that the corresponding phototransducers of each linear array may be physically arranged in any manner on a common substrate to accommodate the physical dimensions of the beam of radiation 28. Similar photoresistor and photodiode linear arrays are currently available in a microcircuit package complete with the scanning electronics from Reticon Corporation.

Figure 3:
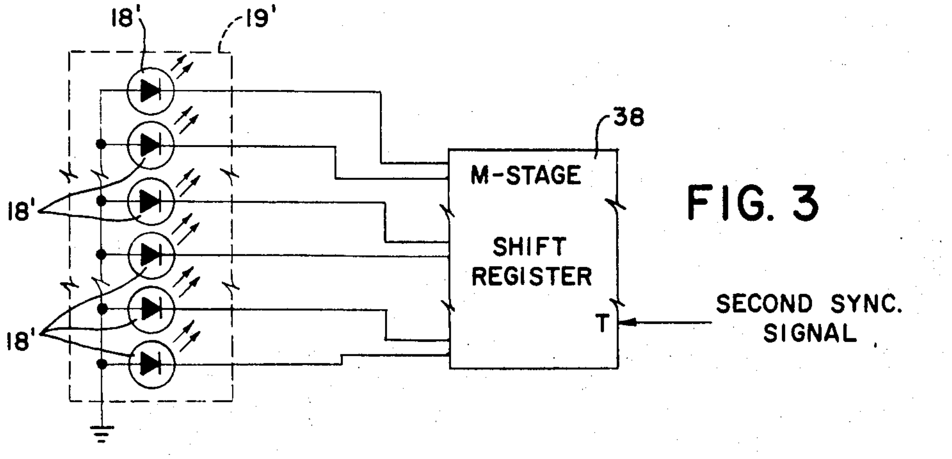
FIG. 3 is a circuit diagram of a linear array of selectively energizable point sources of radiation suitable for use in FIGS. 1 and 5.
Figure 4:
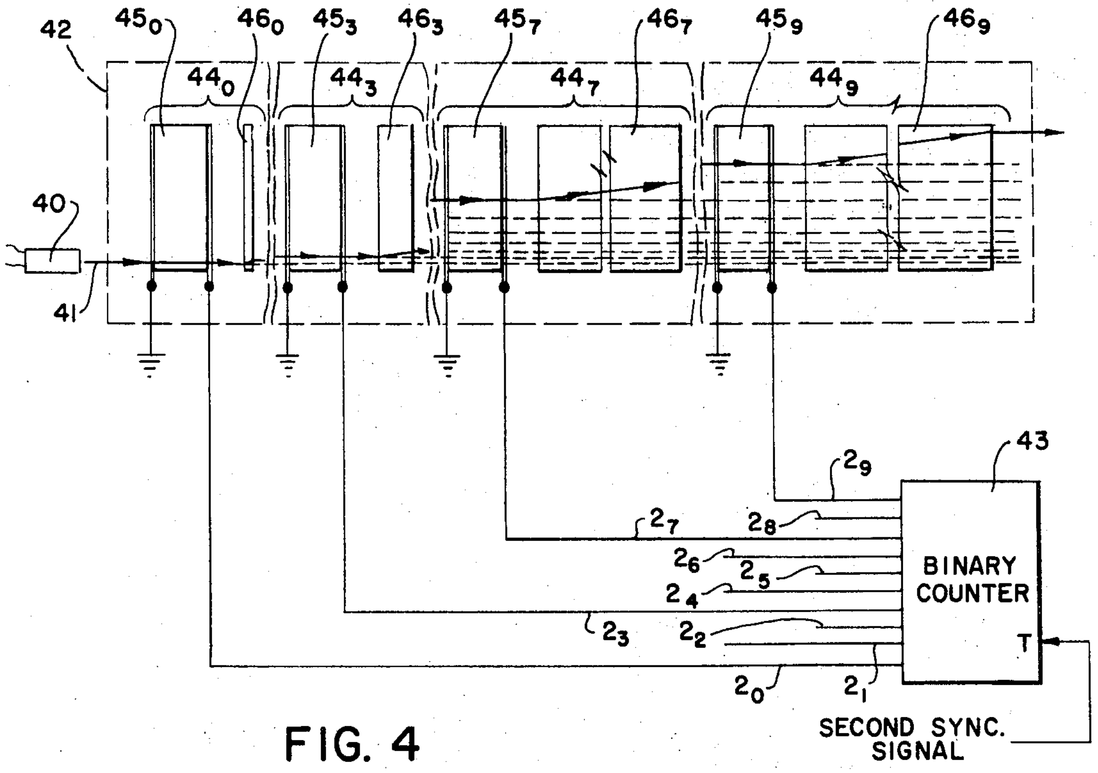
FIG. 4 is an illustration of radiation deflecting apparatus suitable for alternate use as the point sources of radiation in FIGS. 1 and 5.

Referring now to FIGS. 3 and 4, there are shown first and second embodiments of the linear array 19 of point sources 18 of radiation suitable for use in FIG. 1. In the embodiment of FIG. 3, an exemplary linear array 19' of individual radiation emitters, such as light emitting diodes 18', is shown, whereas, in FIG. 4, time-sequenced point loci 18 of radiation are developed in response to the deflection of a collimated or convergent beam of radiation developed by a single radiation emitter 40.

In the embodiment of FIG. 3, each of the M radiation emitters may comprise silicon or GaAs P-N light emitting diode junctions or other semiconductor devices that emit visible light in response to an electrical signal applied across each emitter. Accordingly, one terminal of the illustrated M light emitting diodes 18' is commonly connected to a common potential and the other terminal is adapted to receive an energizing signal developed by shift register 38 in response to the second sync signal developed by the sync signal generating circuit 26. The operation of a silicon light emitting diode 18' is described in the article entitled SILICON AVALANCHE LIGHT SOURCES by L. J. Kabell and C.J. Pecoraro appearing in the volume entitled OPTICAL AND ELECTRO-OPTICAL INFORMATION PRICESSING edited by Tippett et al., published by the MIT Press, Cambridge, Mass., 1965. Exemplary silicon light emitting diode arrays are also currently available in a microcircuit package from Fairchild Semiconductor Inc., and further discussion of the operation of the first embodiment of the point sources 18 of radiation is deemed unnecessary. Other discrete point sources of radiation that could be employed in the same manner as the embodiment of FIG. 3 include plasma display and fluorescent display elements arranged in a linear array of M elements.

Turning now to FIG. 4, the second embodiment of the linear array 19 of M point sources 18 of radiation illustratively comprises a laser 40 generating a collimated beam of radiation 41, digital light deflector 42 and a ten stage binary counter 43 capable of producing a binary count of a maximum of 1,023 occurrences of the second sync signal. The digital light deflector 42 is described in great detail in the article entitled CONVERGENT BEAM DIGITAL LIGHT DEFLECTOR by W. Kulcke et al. appearing in the aforementioned book entitled *Optical and Electro-optical Information Processing*. Basically, the digital light deflector 42 comprises 10 light deflector elements $44_0$ to $44_9$ corresponding to the 10 stages of the binary counter 43, each element 44 comprising an electro-optical liquid or crystaline cell 45 and a birefringent crystal or prism 46. An unpolarized, collimated light beam, passing through a birefringent crystal such as calcite, splits into an oridinary and an extraordinary ray. These rays are linearly polarized, their directions of polarization being perpendicular to each other. While at normal incidence the ordinary ray passes straight through the crystal 46, and the extraordinary ray is diverted. Both rays leave the crystal 46 in their original direction, but they are displaced by a distance proportional to the length of the crystal 46. Each electro-optical cell 45 employs the longitudinal, electro-optic, Pockels effect and is capable of rotating the planar polarization of linearly polarized light through 90° in response to a voltage potential applied across the electro-optical cell 45. Other features of the digital light deflector for both collimated and convergent beams of radiation are described in greater detail in the aforementioned article.

Referring to FIG. 4, four deflector elements $44_0$, $44_3$, $44_7$ and $44_9$ of the ten deflector elements are shown. The birefringent crystals $46_0$, $46_3$, $46_7$ and $46_9$ depicted in FIG. 4 are progressively larger so that the beam of radiation is split into the extraordinary beam depicted in solid lines and the ordinary beam depicted in broken lines by each birefringent crystal 46, the degree of deflection of the extraordinary ray being increased with the increase in thickness of the crystals 46. The deflection of the linearly polarized radiation in the beam 41 can be controlled by applying a switching voltage developed by the binary counter 43 to certain ones of the electro-optic crystals 45 dependent upon the stored binary count. Assuming that the original polarization direction of the beam 41 of radiation is horizontal, application of a voltage signal to an electro-optics switch 45 changes the direction of polarization from horizontal to vertical or vice versa. Consequently, a multiplicity of different output loci of the beam of radiation energizing from birefringent crystal $46_9$ can be digitally defined. The total number of loci of the beam 41 exiting crystal $46_9$ numbers 1,023 and, the beam 41 may therefore be shifted in one dimension from its original position entering the digital light deflector 42 through the 1,023 loci in response to the counting of each pulse of the second sync signal by the counter 43.

Other light deflecting apparatus such as the acousto-optical or Bragg cell deflection apparatus mentioned hereinbefore may also be employed to define a number of point sources or loci 18 of radiation in the linear array 19.

Figure 5:
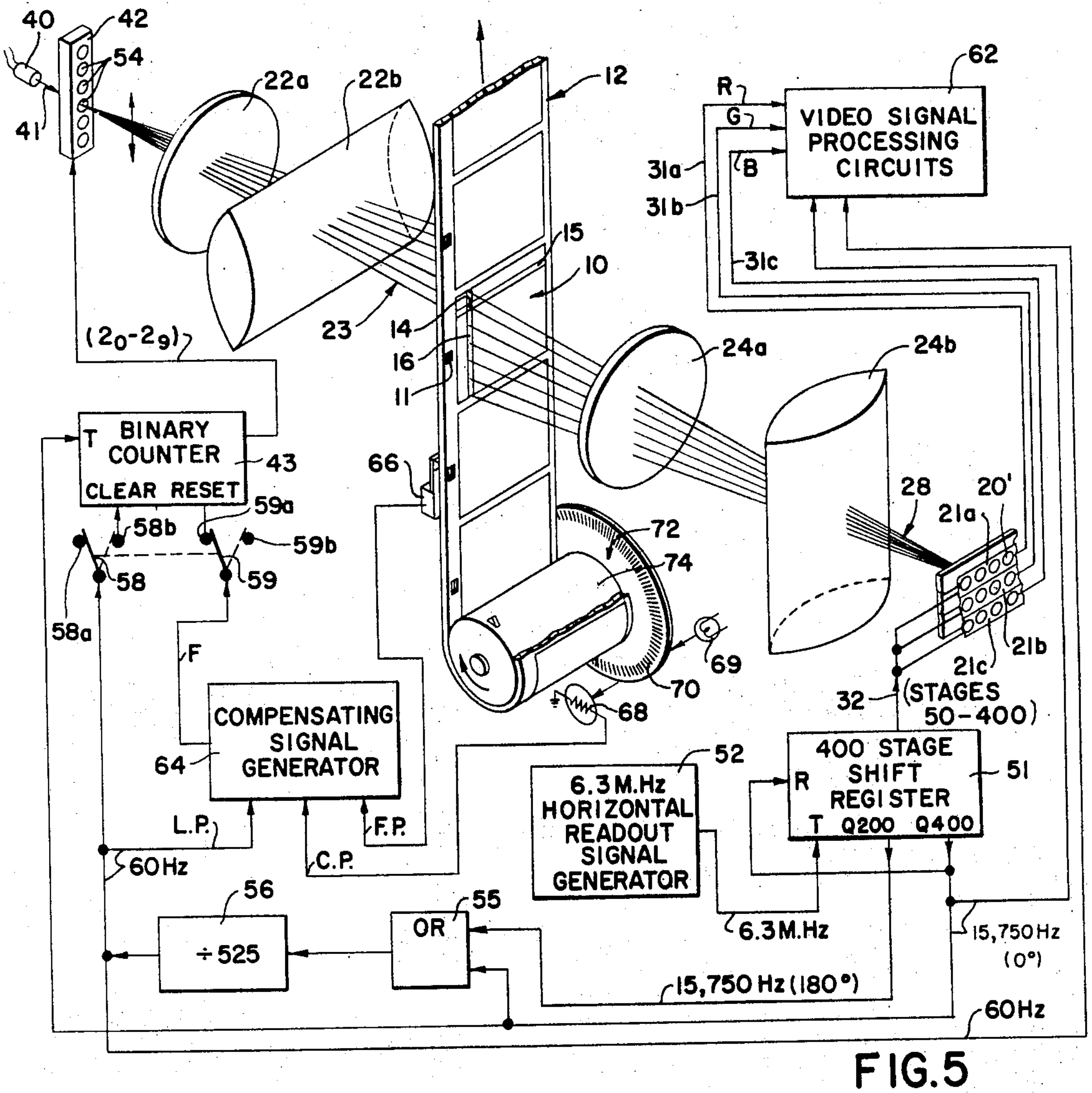
FIG. 5 is an illustration, in partial perspective, of a telecine system for scanning either stationary or moving image frames at a television scanning rate comprising the improved optical-to-electrical signal transducer apparatus of FIG. 1 coupled with an illustrative electrical circuit diagram.

Referring now to FIG. 5 there is shown a telecine system employing the improved optical-to-electrical signal transducer apparatus of the present invention for deriving video signals representative of the information content of M × N scanned elementary points 14 of image frames 10 on stationary or continuously moving motion picture film 12 for use in television transmission or for direct application to a home television receiver in the manner described in greater detail in the aforementioned U.S. Pat. application Ser. No. 60,493. The elements and operation of the telecine system of FIG. 5 will first be described under the assumption that the image frames 10 are intermittently advanced and maintained in a stationary relationship with the linear arrays 19 and 21 during scanning.

During reproduction of a picture on a television receiver, the face of the picture tube is scanned in a predetermined pattern with an electron beam while the intensity of the beam is varied by a video signal in synchronism with the scanning pattern to control the intensity and color of the light emitted by the phosphor screen. The NTSC scanning procedure in use in the U.S. employs horizontal linear scanning of the electron beam in an interlaced pattern that includes a total of 525 spaced horizontal scanning lines in a rectangular frame having an aspect ratio of 4 to 3. The frames are repeated at a rate of 30 per second with two television fields interlaced in each frame. The first frame in each field consists of 262.5 odd scanning lines and the second field in each frame consists of the remaining 262.5 even scanning lines. Thus, the fields are repeated at a rate of 60 per second (59.97 for color). In the telecine system of FIG. 5, it is therefore necessary to sequentially illuminate 262.5 rows 15 of N elementary points 14 on the image frame 10 during the period of the 60 Hz. television field rate. To accomplish this sequential scanning of the image frames 10, it is necessary to employ a total of at least 263 point sources of light (assuming that the film frame 10 is stationary during scanning) and to sequentially energize each point source at a frequency of 60 × 262.5 = 15,750 Hz. - the standard television horizontal deflection rate. For interlaced scanning of successive image frames, 525 point sources or loci may be employed. To provide the 4 to 3 aspect ratio, it may be desirable to employ approximately 350 radiation or photosensitive elements 20 in the 3 linear arrays 21*a* to 21*c* ($N = 350$). In television reproduction, a portion of the time period of the 60 Hz. field rate is alloted to the vertical retrace time necessary to deflect the scanning beam back to its original position. Therefore, a number of point sources or loci of light less than 263 (e.g. 256) may be employed. Likewise, a portion of the time period of the 15,750 Hz. signal is alloted to a horizontal retrace time, and a corresponding number of photosensitive devices 20 less than 350 may be employed or an additional time delay may be added to the scanning of each of the photosensitive devices.

Although we have selected N to equal 350 in this instance, it is possible to employ a fewer number of radiation sensitive devices depending on the desired resolution. Also, if luminance and chrominance signals, rather than red, blue and green video signals, are desired, only the luminance signal needs to be of high resolution and the number of radiation sensitive devices for the chrominance signals may be further reduced.

Therefore, in FIG. 5, in order to scan color pictorial information in the image frame 10 on the motion picture film 12, we have employed first, second and third linear arrays 21*a* to 21*c* of 350 photosensitive devices 20 in each array. As explained hereinbefore with reference to FIG. 2, the linear arrays 21*a* to 21*c* are chosen to be sensitive to the red, blue and green visible color spectrums in the light beam 23. Each of the parallel 350 photosensitive devices 20 in the linear arrys 21*a* to 21*c* are connected in sequence to stages 50 to 400 of a 400 stage shift register 51 which develops the read out signal applied to the photosensitive devices 20. The 400th stage of the shift register 51 is connected in ring counter fashion to the first stage thereof, and the first through 49th stages of the shift register 51 simply provide a time interval equivalent to the retrace time period of the horizontal deflection signal. The time-sequenced read out signals developed by the shift register 51 have a frequency equal to 400 × 15,750 Hz. = 6.3 MHz. Therefore, a 6.3 MHz. horizontal read out signal generator 52 provides the requisite first synchronization signal for the shift register 51.

The 400 stage shift register 51 also provides a frequency division of the 6.3 MHz. signal to develop the 15,750 Hz. horizontal deflection signal that is employed as the second synchronization signal to sequentially develop the 263 point sources of loci 18 of light. In FIG. 5, we have employed the digital light deflector 42′ of FIG. 4 and an emitter 40 of a collimated or convergent beam of light (for example). A binary counter 43 is also provided in the manner hereinbefore described to count the 15,750 Hz. signals developed by the 400th state of the shift register 51 and to sequentially deflect the light beam through the loci 54.

The 400 stage shift register 51 may also be employed to develop the 60 Hz. vertical deflection signal by combining the 15,750 (180°) signal developed by the 200th stage and the 15,750 Hz. (0°) signal developed by the 400th stage in OR gate 55 to develop a signal having a frequency of 31,500 Hz. The 31,500 Hz. signal is applied to the input terminal of a ÷ 525 circuit 56. The ÷ 525 circuit 56 is well known in the prior art of interlaced scanning for television reproduction to develop from the 31,500 Hz. signal a 60 Hz. signal that is phase related to the 15,750 Hz. (0°) signal to provide interlaced horizontal scanning of the first and second television fields occurring in each television frame.

The binary counter 43 also has "clear" input terminals and "reset" input terminals connected to each stage thereof. During the scanning of stationary image frames 10, first and second switches 58 and 59 are closed upon the contacts 58*a* and 59*a* respectively so that the 60 Hz. signal is applied to the "clear" input terminals of the binary counter 43. At each occurrence of the 60 Hz. signal applied to the clear input terminals, the count achieved at all stages of the binary counter 43 is changed to 0. In this manner, at each occurrence of a 60 Hz. signal, the light emitted by the digital light deflector 42′ is restarted at the same row 15 on the image frame 10.

Thus, each image frame 10 on the film 12 may be scanned by any number of television fields to develop the red, green and blue video signals on the output conductors of the linear arrays 21*a* to 21*c*. The red, green and blue video signals and the 60 Hz. and 15,750 Hz. signals may be applied to video signal processing circuits 62 of a television transmitter or receiver for television transmission or for direct application to the respective circuits in a television receiver for remote or local viewing of the pictorial information in the image frames 10 on the motion picture film 12. The operation of the linear arrays 21*a* to 21*c* may be blanked during the period of time necessary to advance the next image frame 10 on the film 12 into scanning position with respect to the optical-to-electrical signal transducer apparatus.

The remaining elements of FIG. 5, the circuit diagram of FIG. 6 and the wave form diagrams of FIG. 7 will now be explained with respect to the second mode of operation of the telecine system. In the second mode of operation, the image frames 10 on the motion picture film 12 are continuously advanced through the scanning position of the optical-to-electrical signal transducer apparatus, and it is necessary to account for the position and velocity of the moving image frames 10 with respect to the 60 Hz. vertical deflection signal during operation of the system. Illustratively, it will be assumed that the image frames 10 on the film 12 are continuously advanced at 24 frames per second, that is at a frequency of 24 Hz. It will also be assumed that the normal direction of scanning of the point sources or loci 18 of light is opposite to the direction of movement of the image frames 10. Under these conditions, as observed in the aforementioned U.S. Pat. application Ser. No. 60,493, the effective second or vertical dimension of the moving image frames 10 is foreshortened during the time period of the video fields to an effective distance equal to 60–24/60 = 3/5 of the normal vertical dimension. Also, because of the disparity between 60 Hz. and 24 Hz., it has been found expedient in the past to scan two successive film frames with 5 video scanning fields. To overcome these difficulties, we provide that the count achieved in the binary counter 43 be changed at each occurrence of a 60 Hz. vertical deflection signal an amount sufficient to reflect the instantaneous position of the image frame 10 to be scanned in the manner hereinbefore described during the period of the next 60 Hz. signal.

To this end, a film motion compensating signal generator 64 (shown in detail in FIG. 6) is adapted to receive a 24 Hz. frame rate signal FP, a velocity signal CP (not shown in FIG. 7) and the 60 Hz. signal LP to develop a compensating signal F (FIG. 7) having a constant binary value during the field period of each 60 Hz. signal that is applied to the "reset" input terminals of the binary counter 43 through the switch 59 and switch contact 59*b* at each occurrence of the 60 Hz. signal LP.

The 24 Hz. frame rate signal FP is developed by a frame detector 66 of a type shown and described in greater detail in the aforementioned U.S. Pat. application Ser. No. 191,673 which responds to perforations 11 associated with each image frame 10 to develop the frame rate signal FP. Other optical perforation or frame identifying indicia sensors may be alternately employed. The velocity signal CP comprises a series of clock pulses developed by a photodetector 68 that responds to light from lamp 69 passing through slits 70 in a disc 72. The disc 72 is adapted to rotate with the continuous rotation of a capstan 74 associated with the film drive mechanism. In the depicted example, the capstan 74 makes one complete rotation during the time that two successive image frames 10 are advanced through the film scanning zone, and the total number of signals produced by the light chopping action of the slits 80 during this time will be equal to 525. This relationship of the number of slits 72 will be explained in greater detail in the discussion of FIG. 6. For the time being it is well to note that, since the total number of slits 70 and the spacing between slits is constant, the frequency of the velocity signal CP varies in direct proportion to the rate of movement of the film 12. If the film frame rate is equal to 24 Hz. and the film velocity is constant, for example, the frequency of the clock pulse signal CP would be equal to 24 Hz. × 525/2 = 6.3 KHz. Likewise, the frequency of the frame rate signal FP varies in direct porportion to the frame rate of movement. To summarize, the frame rate signal FP represents the instantaneous initial positions of image frames 10 moving through the film scanning zone whereas the velocity signal CP represents the instantaneous velocity of the moving film 12.

The signal generator 64 is shown in greater detail in FIG. 6 which will be explained with reference to the wave form diagrams of FIG. 7. Basically, the signal generator 64 operates in response to the frame rate signal FP and the velocity signal CP to produce first and second binary count digital signals D and E that continuously change in response to each clock pulse of the velocity signal and which each represent the instantaneous position of first and second image frames 10 advancing through the film scanning zone with respect to the original or undeflected locus of the scanning beam of light. The signal generator 64 responds to the 60 Hz. signal LP and the frame rate signal FP to develop the digital compensating signal F having a binary value representative of the instantaneous position of first or second image frames continuously advanced through the film scanning zone at the time instants $t_0$ to $t_n$ determined by each pulse of the 60 Hz. vertical deflection signal.

As stated hereinbefore, the compensating signal F is applied to the reset inputs of the binary counter 43 at each occurrence of a 60 Hz. signal to reset the count in the binary counter 43 to that of the compensating signal. The binary counter 43 also receives and counts the 262.5 horizontal deflection signals occurring during the period of the 60 Hz. signal to illuminate the respective rows on the image frame 10. This operation of the binary counter 43 is illustratively depicted by the solid lines sawtooth wave form of signal K. Although signal K is sawtooth in shape, it is meant to represent a value of the binary count in the binary counter 43. Since, as stated hereinbefore, the effective vertical dimension of the image frame 10 is compressed a predetermined amount, it is necessary to foreshorten the path of travel of the loci 54 of the scanning point source of light over the scanned image frame 10 without reducing the constant number of loci 54 of the light. This may be accomplished by providing a mechanical adjustment (not shown) of the cylindrical lens 22*b* to compress the distance between the successive narrow elongated beams 23 an amount sufficient to insure that all 262.5 narrow, elongated beams of radiation fall upon the same image frame 10 during each video field period. To this end, specific cylindrical lenses for each known rate of movement of the film 12 may be provided for insertion in the optical-to-electrical signal transducer apparatus. This effective foreshortening of the vertical dimension of scan of the loci of light is shown by the broken line wave form of the signal J. Signal K in FIG. 7 illustrates the effect achieved by combining the compensating signal F with the broken line wave form of signal J, whereby each film frame is scanned in two or three video fields.

Figure 6:
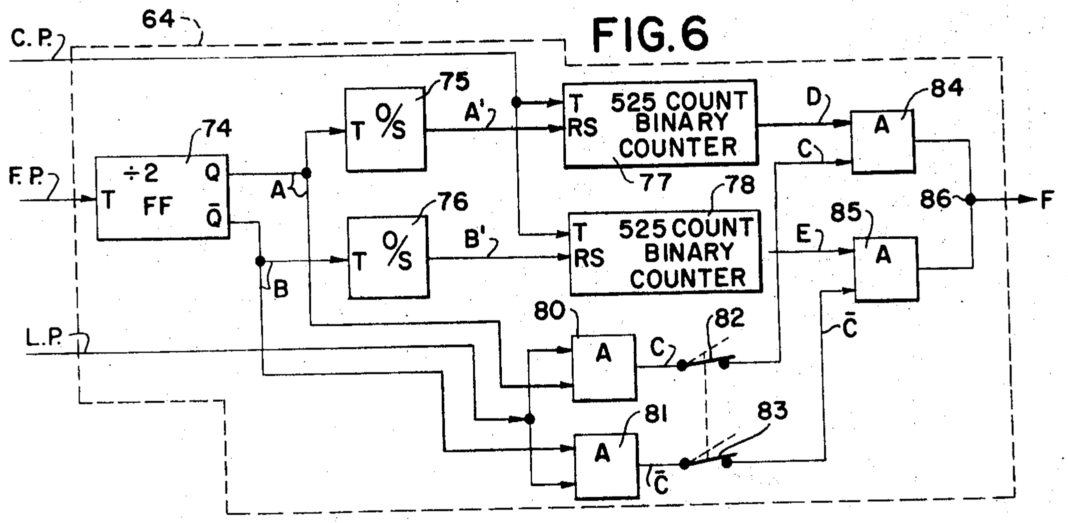
FIG. 6 is a circuit diagram of a signal generator used in FIG. 5 to control the scanning of continuously moving image frames.

Referring now to FIG. 6 in greater detail, the frame rate signal FP is applied to the trigger input of a ÷ 2 flip flop 74 which produces, at output terminals Q and $\bar{Q}$, complementary half frame rate frequency signals A and B. The half frame rate frequency signals A and B are applied to the T inputs of one shot circuits 75 and 76 respectively to produce the first and second 12 Hz, 180° out-of-phase, reset signals A′ and B′, respectively, that are applied to the reset signals input terminals of 10 stage, 525 count, binary counters 77 and 78, respectively. The velocity signal CP is also applied to the T input terminals of the 525 count binary counters 77 and 78 which count the 6.3 KHz. velocity signal CP and produce the first and second binary count digital signals D and E representative of the instantaneous positions of first and second image frames detected by the frame detector 66 (FIG. 5) continuously advanced through the film scanning zone. In FIG. 7, the wave forms of the digital signals D and E are drawn as sawtooth wave forms strictly as an illustration of the instantaneous values and the relative changes in the binary count digital signal levels of the digital signals D and E. At a frame rate of 24 Hz., the wave forms of signals D and E also depict the relative relationship between the number of television fields occurring in response to the vertical deflection signal during the time interval that a single image frame advances through the film scanning zone. Between the times $t_3$ to $t_8$, for example, one film frame 10 has advanced past 525 of the loci of the digital light deflector 42 during the total time period of five 60 Hz. signals LP.

The remaining elements of FIG. 6 transfer the instantaneous binary count of the first and second digital signals D and E to the reset input terminals of the binary counter 43 (in the form of the compensating signal F) at each occurrence of a pulse of the 60 Hz. vertical deflection signal LP that falls between each pulse of the 24 Hz. frame rate signal FP. In this manner, each image frame detector by the frame detector 66 is scanned over one or more 60 Hz. periods within a variable time period up to one-sixtieth of a second. First and second image frames passing through the film scanning zone are alternately scanned, at a frame rate of 24 Hz., over time periods of one-twentieth or one-thirtieth of a second.

To this end, in FIG. 6, the pulses of the 60 Hz. vertical deflection signal that occur within the time period of the first and second half frame rate frequency signals A and B are separated by AND gates 80 and 81 into first and second pulse trains C and $\bar{C}$ that are applied to AND gates 84 and 85 to sample the instantaneous binary counts of the digital signals D and E to produce the digital compensating signal F. More particularly, the 60 Hz. vertical deflection signals are applied to the first input terminal of the AND gates 80 and 81. The first half frame rate frequency signal A is applied to the second input terminal of AND gate 80, and the second half frame rate frequency signal B is applied to the second input terminal of AND gate 81. AND gates 80 and 81 respond to the simultaneous application of a high logic level signal applied to thier respective first and second input terminals to transfer selected pulses of the 60 Hz. vertical deflection signals to the output terminals of the AND gates 80 and 81. The sampling signals C and $\bar{C}$ depicted in FIG. 7 comprise the transferred pulses of the 60 Hz. signal LP. The sampling signals C and $\bar{C}$ are conducted by normally closed switches 82 and 83 to first input terminals of AND gates 84 and 85. The digital signals D and E are applied to second input terminals of the AND gates 84 and 85, respectively, and the AND gates 84 and 85 respond to the pulses of the sampling signals C and $\bar{C}$ to transfer the instantaneous binary count of the digital signals D and E to the common output terminal 86 in the form of the compensating signal F. The switches 82 and 83 are ganged with the switches 58 and 59 of FIG. 5 to be closed during scanning of continuously moving film 12. Of course, the switches 58, 59, 82 and 83 may comprise electronic switching elements. For simplicity of illustration, AND gates 84 and 85 in FIG. 6 and switch 59 in FIG. 5 are depicted as single elements; however, it will be understood that a multiplicity of such elements may be provided between the output terminals of each state of the binary counters 77 and 78 and the reset terminals of each stage of the binary counter 43', so that the binary count stored in each stage may be efficaciously transferred between the counters.

Figure 7:
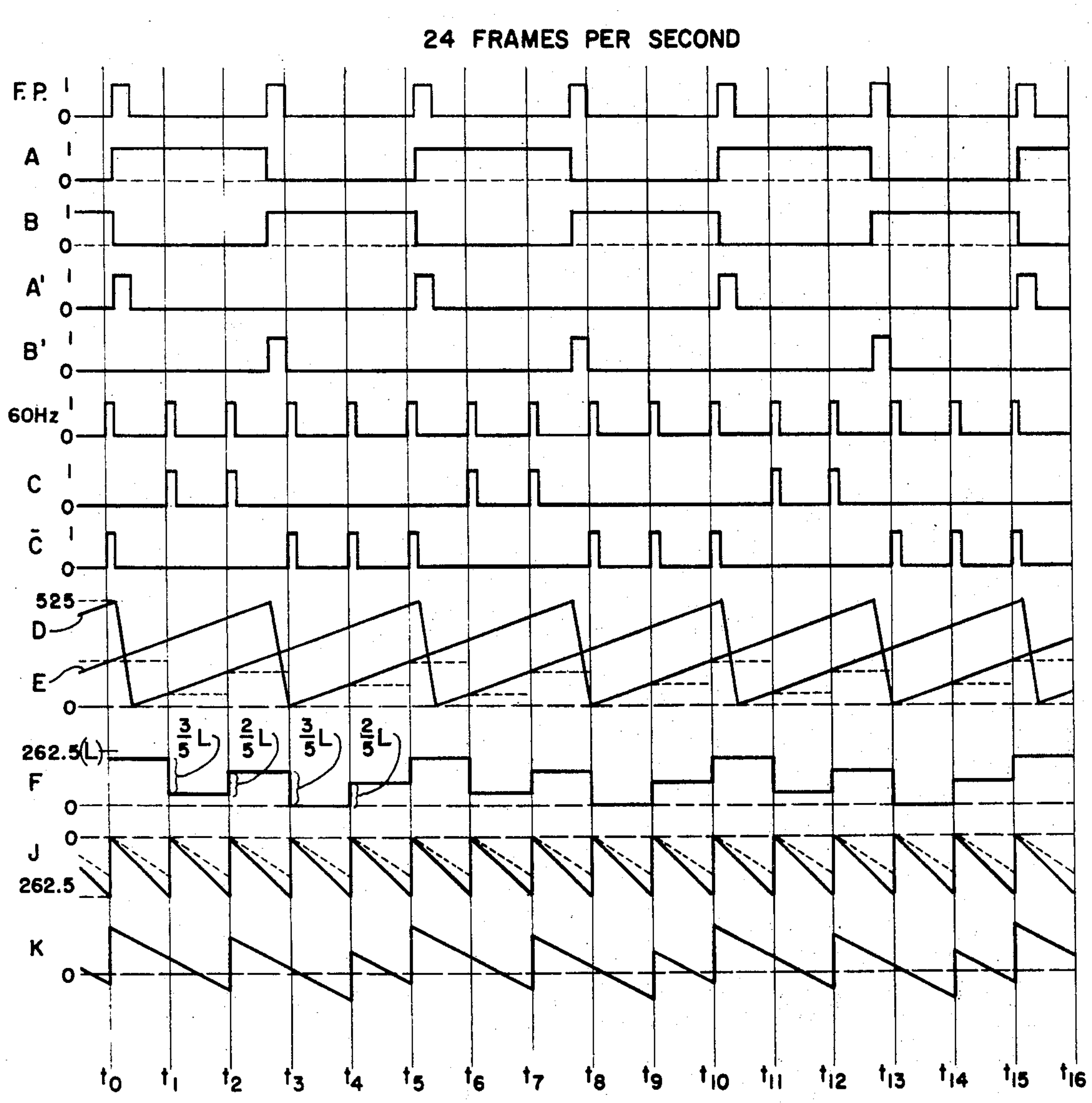
FIG. 7 is a wave form diagram of signals developed at various points in the circuit diagrams of FIGS. 5 and 6.

Thus, with reference to FIG. 7, at each instant in time $t_0$ to $t_n$, first and second image frames 10 on the film 12 are passing through the film scanning zone of the optical-to-electrical signal transducer apparatus. The signal generator 64 develops the first and second time-position indicating digital signals D and E representative of the instantaneous position of the first and second continously moving image frames, and the binary count of either the digital signal D or E is sampled at each instant $t_0$ to $t_n$ to produce the digital compensating signal F. Due to the relationship of the frequency of the velocity signal CP and the 60 Hz. frequency of the vertical deflection signal LP, the relative change in the binary count digital signal level of the digial compensating signal F, at each time instant $t_0$ to $t_n$, is representative of the actual, required shift in the starting locus of the scanning spot in the digital light deflector 42 to superimpose the next scanning field upon the same image frame (at times $t_2$, $t_4$, $t_5$, $t_7$, etc.) or to shift the scanning to the next image frame entering the film scanning zone (as shown, for example at time $t_1$, $t_3$, $t_6$, $t_8$, etc.). Referring to the illustrative wave form K it will be noted that at the instants $t_2$, $t_4$, $t_5$, $t_7$, etc., the starting locus of the scanning spot of light is shifted in the direction of film movement an amount equal to the vertical dimension of the image frames 10 so that the same image frame 10 may be scanned. However, at times $t_1$, $t_3$, $t_6$, $t_8$, etc., the scanning locus of the spot of light is not shifted so that the next succeeding image frame following the previously scanned image frame may be scanned. In the same manner as described, any film frame rate may be accommodated by the telecine system of FIG. 5. As mentioned hereinbefore, the cylindrical lens 22b may be provided with a mechanical, manual adjustment so that an operator of the telecine system may adjust the first cylindrical lens 22 an amount sufficient to insure that the narrow elongated beams 23 of radiation generated in the period of each television scanning field are superimposed upon one image frame 10.

Thus, we have described an improved optical-to-electrical signal transducer apparatus for two dimensional scanning of two dimensional images on information bearing media, one dimension of scan being accomplished by selectively energized point sources of radiation extending in a linear array in the second dimension of the image frame, the second dimension of scan being accomplished by a plurality of radiation sensitive devices arranged in a linear array extending in the first dimension of the image frame. Scanning signal generating apparatus has been shown for selectively reading out electrical signals developed by the radiation sensitive devices in response to the radiation modulated in intensity by the information content of a plurality of illuminated elementary points of the image frame. Apparatus has also been shown for selectively energizing the point sources of radiation in a time sequence related to the time sequence during which the plurality of radiation sensitive devices are read out. In one of the preferred embodiments of the invention, a telecine system has been disclosed incorporating the improved optical-to-electrical signal transducer apparatus for scanning either stationary image frames or continuously moving image frames.

The improved optical-to-electrical signal transducer apparatus employs long lived, low power, solid state electronic components and avoids the bulk and high power supply requirement of cathode ray devices.

The inventon has been described in detail with particular reference to the preferred embodiments thereof, but it will be understood that variations and modifications can be effected within the spirit and scope of the invention.

We claim:

1. A method of scanning M rows and N columns of M × N elementary points of an image and producing M × N electrical signals representative of the information content of the M × N elementary points of said image, said method comprising the steps of:

providing M discrete, selectively energizable point sources of radiation for sequentially producing a point source beam of radiation emanating from each of M loci, one corresponding to each of said rows, said loci extending in a linear array;

energizing, in sequence, in response to a synchronization signal said point sources of radiation; optically producing from each of said point source beams of radiation, a corresponding narrow, elongated beam of radiation;

directing each of said narrow, elongated beams individually upon the corresponding one of said M rows, whereby each row is exposed to that beam emanating from the corresponding one of said loci, and each beam is modulated in intensity by the information content of the N elementary points of the corresponding row; and sensing the intensity of the radiation from the N elementary points of each row, and sequentially producing N discrete electrical signals corresponding to the sensed intensities and representative of the information content of the N respective elementary points of each row.

2. The method of claim 1 further comprising the steps of:

a. providing a first synchronization signal having a first predetermined frequency $F_1$;

b. providing a second synchronization signal having a second predetermined frequency $F_2$ not greater than $F_1/N$;

c. sequentially producing in response to the first signal, at the first predetermined frequency $F_1$, said N discrete electrical signals; and d. sequentially producing in response to the second signal, at the second predetermined frequency $F_2$, said scanning beams.

3. A method of scanning M rows of N columns of M × N elementary points of an image and producing M × N electrical signals representative of the information content of the M × N elementary points of said image, said method comprising the steps of:

providing M discrete selectively energizable point sources of radiation at M loci extending in a first linear array, one loci for each row, each of said point sources of radiation producing a point source beam of radiation;

optically producing from each of said point source beams of radiation, a corresponding narrow, elongated beam of radiation;

optically imaging each of said elongated beams of radiation individually upon a corresponding one of said M rows of N elementary points of said image, whereby the N elementary points of one of said M rows are simultaneously exposed to said elongated beam of radiation originating at the corresponding one of said M loci, and said elongated beam of radiation is modulated in intensity by the information content of the N elementary points of that one of said M rows;

providing N radiation sensitive means extending in a second linear array, one radiation sensitive means for each column, each responsive to incident radiation to produce an electrical signal;

optically imaging each of said N columns of M elementary points of said image upon a corresponding one of said N radiation sensitive means, whereby said N radiation sensitive means are exposed to radiation modulated in intensity by the information content of the N elementary points of that exposed at that instant to said beam of radiation, and said N radiation sensitive means respond thereto to produce N discrete electrical signals representative thereof;

sequentially reading out, at a first predetermined frequency, the N discrete electrical signals developed by said N radiation sensitive means; and sequentially energizing at a second predetermined frequency related to the first predetermined frequency, said M point sources of radiation whereby the M rows of said image are sequentially exposed to said elongated beams of radiation, and M × N electrical signals representative of the information content of the N elementary points of said M rows are sequentially produced and read out.

4. Apparatus for scanning M rows and N columns of M × N elementary points of an image and producing M × N electrical signals representative of the information content thereof, said apparatus comprising:

M discrete, selectively energizable means for providing a point source beam of radiation, said selectively energizable means extending in a first linear array, one said means for each of said M rows;

means for optically producing, from each point source beam of radiation produced by said M selectively energizable means, a corresponding narrow elongated beam of radiation;

means for optically imaging each of said M elongated beams of radiation upon the corresponding one of said M rows such that each of said M rows will be individually exposed to an elongated beam of radiation derived from a corresponding one of said M energizable means, and such that said beam of radiation is modulated in intensity by the information content of the N elementary points of that row;

N radiation sensitive means extending in a second linear array, each responsive to the intensity of radiation incident thereon for producing a corresponding electrical signal representative thereof;

means for optically imaging each of said N columns upon a corresponding one of said N radiation sensitive means, thereby said N radiation sensitive means are exposed to said beam of radiation originating at one of said M loci and modulated in intensity by the information content of that row exposed to said beam of radiation;

means for sequentially reading out, at a first predetermined frequency, the N discrete electrical signals produced by said N radiation sensitive means representative of the information content of that row exposed to said beam of radiation; and means for sequentially energizing, at a second predetermined frequency, said M selectively energizable means.

5. The apparatus of claim 4 further comprising:

means for providing first and second signals having the first and second predetermined frequencies respectively;

means for applying the first signal to the sequentially reading out means; and means for applying the second signal to the sequentially energizing means,

6. The apparatus of claim 4 wherein said M selectively energizable means comprise M light emitting diodes.

7. The apparatus of claim 4 wherein said N radiation sensitive means comprise N phototransistors responsive to incident radiation intensities to produce and store the corresponding N discrete electrical signals.

8. The apparatus of claim 4 further comprising synchronizing means for generating a first synchronization signal having a first frequency $F_1$ and means for applying the first synchronization signal in sequence to said means for reading out said N discrete electrical signals and for producing a second synchronization signal having a second frequency $F_2$ after the N discrete electrical signals are read out; and wherein:

said means for reading out said N discrete electrical signals is responsive to the first synchronization signal for reading out each discrete electrical signal produced by said N radiation sensitive means in sequence and for assembling the N discrete electrical signals into a composite electrical signal representative of the information content of the row exposed to said beam of radiation; and said selectively energizable means is responsive to the second synchronization signal for sequentially energizing said M selectively energizable means in a sequence determined by the second frequency $F_2$.

9. Apparatus for scanning M rows and N columns of M × N elementary areas of an image on an information bearing medium and producing M × N electrical signals representative of the information content of said image, comprising:

M discrete, selectively electrically energizable point sources of light extending in a first linear array, one of said sources of light for each of said M rows, each said sources producing a point source beam of light;

a first optical assembly for producing a corresponding narrow, elongated beam of light from each M point source beam of light and for imaging each of the M elongated beams of light upon the corresponding one of the M rows of an image on an information bearing medium;

N discrete light sensitive devices extending in a second linear array at right angles to said first linear array of M point sources each responsive to the intensity of light incident thereon producing a corresponding electrical signal representative thereof;

a second optical assembly for imaging each of the N columns upon a corresponding one of the N light sensitive devices, whereby said N light sensitive devices are exposed to one of the M elongated beams of light and modulated in intensity by the information content of that row exposed to such beam;

a first electrical circuit for sequentially reading out, at a first predetermined frequency, the N discrete electrical signals produced by the N light sensitive devices; and a second electrical circuit for sequentially energizing at a second predetermined frequency the M point sources of light.

10. The apparatus of claim 9 wherein the second linear array of light sensitive devices are sensitive to light of a first range of wavelengths and further including a third linear array of N discrete light sensitive devices extending parallel to said second linear array of devices, said third array of light sensitive devices being sensitive to light of a second range of wavelengths substantially different from said first range of wavelengths.

* * * * *